Sept. 12, 1967  P. W. JACOBSEN  3,341,099
FLUID OPERATED SENSING HEAD
Filed Nov. 24, 1964  3 Sheets-Sheet 2
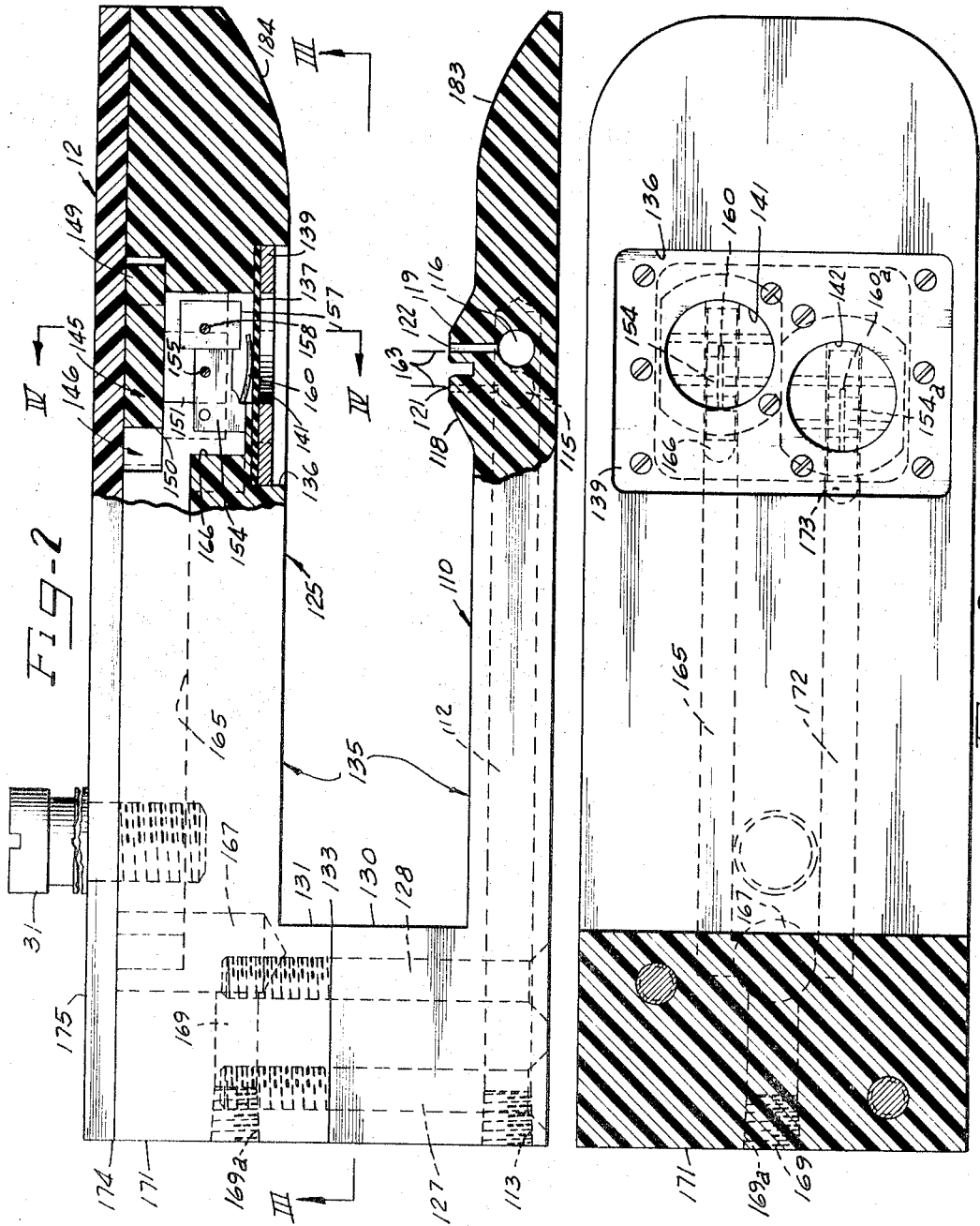
INVENTOR.
PAUL W. JACOBSEN

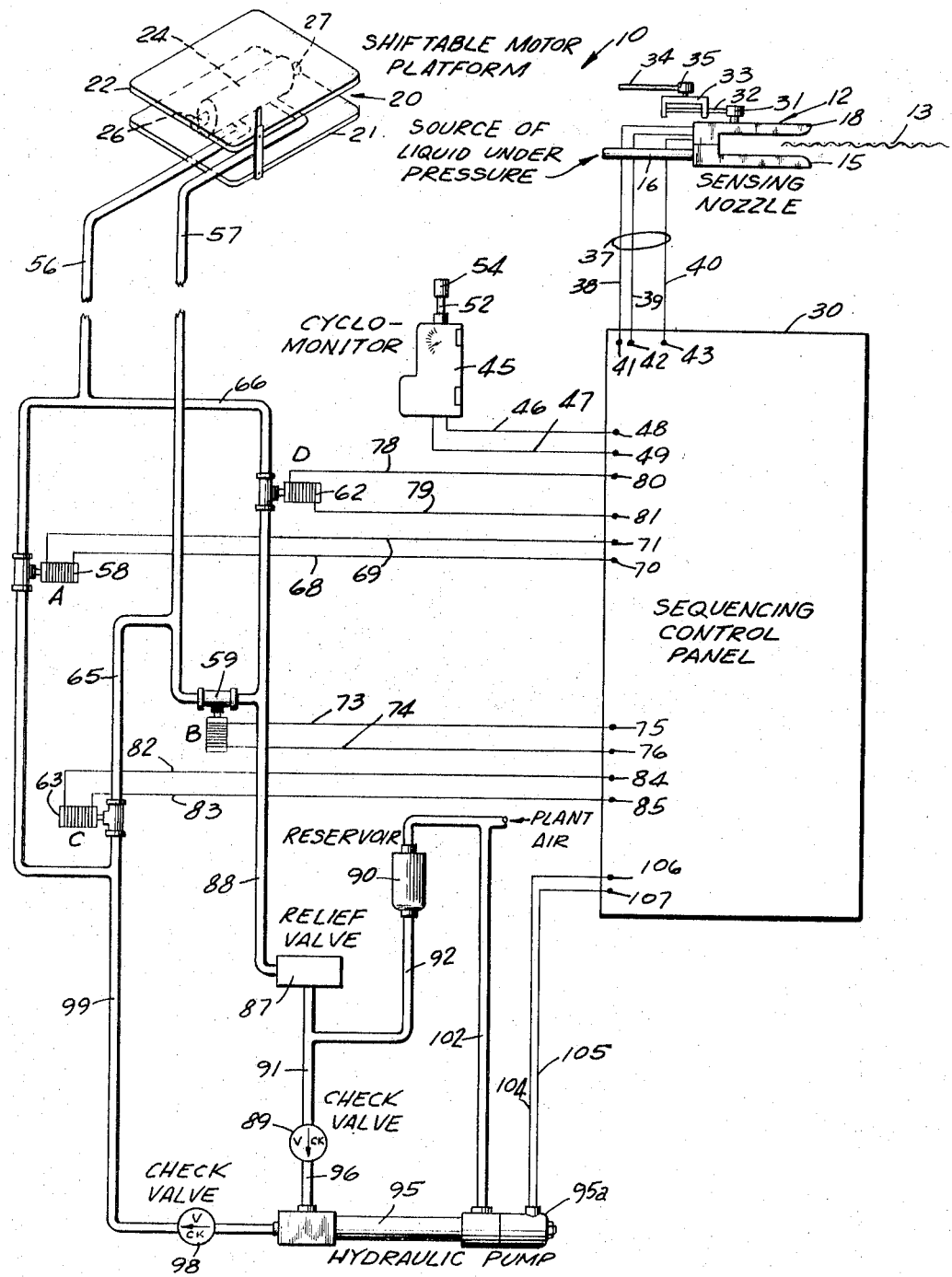

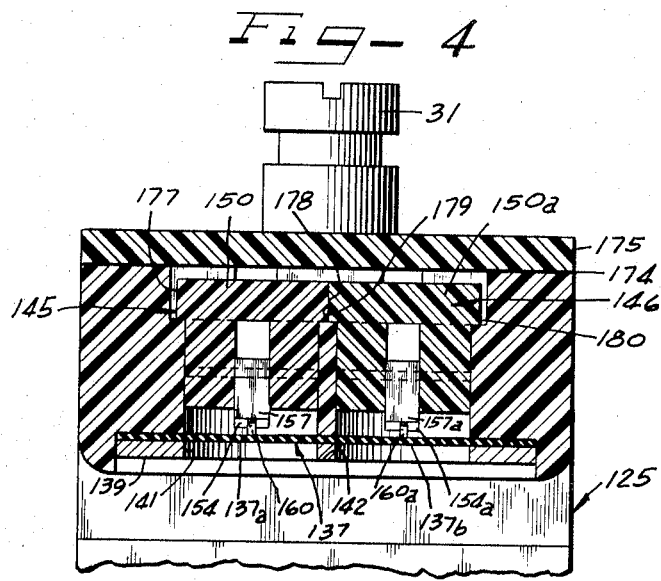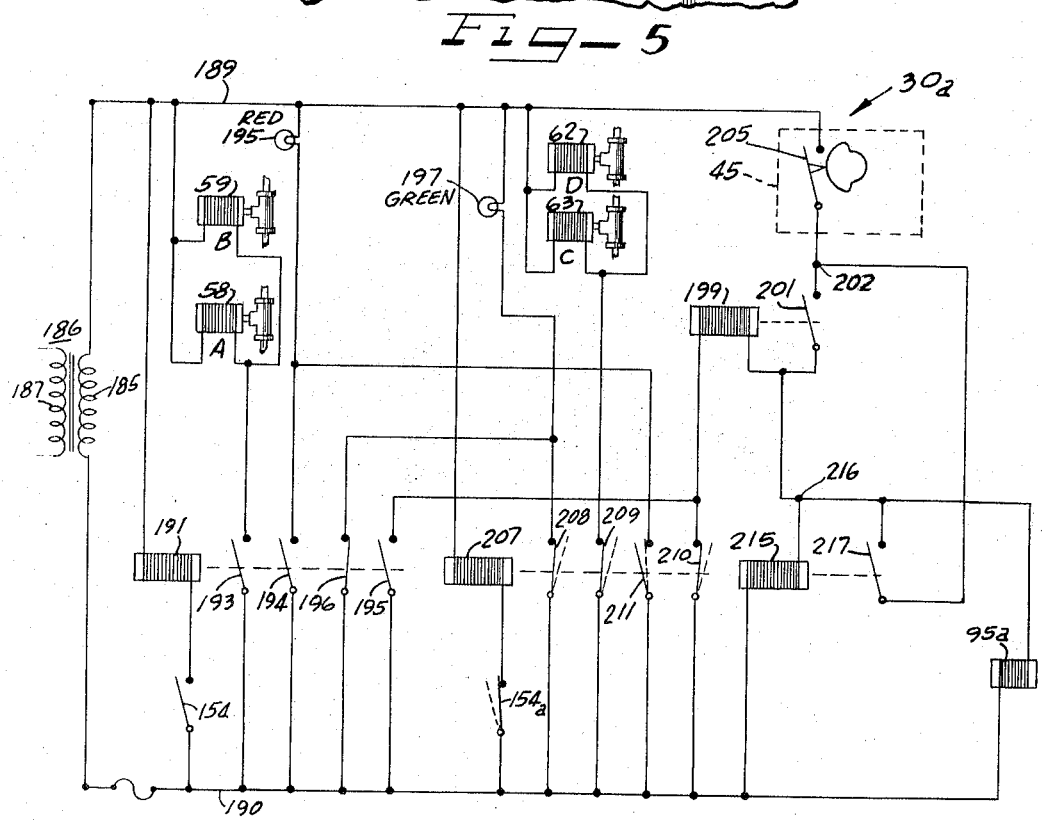

United States Patent Office 3,341,099
Patented Sept. 12, 1967

3,341,099
FLUID OPERATED SENSING HEAD
Paul W. Jacobsen, Kiel, Wis., assignor to H. G. Weber and Company, Inc., Kiel, Wis., a corporation of Wisconsin
Filed Nov. 24, 1964, Ser. No. 413,429
2 Claims. (Cl. 226—19)

This invention relates generally to a fluid operated sensing means and more particularly to a fluid operated sensing head which can be used in conjunction with an edge alignment control system. The edge alignment control system is used to establish a neutral range of edge positions for a moving web as a portion of the moving web passes between opposed members of the fluid operated sensing head.

It is an object of the present invention to provide a fluid operated sensing head utilizing mechanically actuated switching means responsive to relatively light actuating force.

Another object of the present invention is to provide a fluid operated sensing head having a pair of fluid output orifices and a pair of resilient diaphragms each disposed for receiving a flow of fluid from a respective orifice.

Another object of the present invention is to provide a fluid operated sensing head having a boss portion through which fluid output orifices are provided.

Still another object of the present invention is to provide a fluid operated sensing head utilizing a switch plug assembly, whereby an electrical switch can be secured to a plug and the plug and electrical switch inserted into the sensing head.

Yet another object of the present invention is to provide a fluid operated sensing head having a sending portion which sends fluid jets therefrom in accordance with the position of an edge of a moving web, and the fluid operated sensing head has a receiving portion which receives the fluid jets from the sending portion to produce electrical impulse signals in accordance with the position of an edge of a moving web.

A still further object of the present invention is to provide an edge alignment sensing system utilizing commercially available miniature switches which can be actuated directly by a fluid jet flowing from an output orifice, thereby controlling electrical impulses to a sequencing control panel in accordance with the position of an edge of a moving web.

Other objects, features and advantages of the present invention will be apparent from the following detailed description, taken in conjunction with the accompanying drawings, in which:

FIGURE 1 is a diagrammatic illustration of an edge alignment control system utilizing the fluid operated sensing head of the present invention;

FIGURE 2 is a side elevational view of a fluid operated sensing head which is constructed in accordance with the principles of the present invention with portions broken away and in section;

FIGURE 3 is a sectional view taken along the line III—III of FIGURE 2;

FIGURE 4 is a partial sectional view taken along the line IV—IV of FIGURE 2; and FIGURE 5 is a schematic diagram showing the electrical connections of the solenoid valves and sequencing relays, which are controlled by switches in the fluid operated sensing head.

Shown in FIGURE 1 is a web-edge alignment control system which is designated generally by the reference numeral 10. A fluid operated sensing head 12 is constructed and arranged to receive the edge of a moving web 13. The sensing head 12 is provided with a fluid sending unit 15, which receives a flow of fluid through a pipe 16, which is preferably connected to the city water supply. The sensing head 12 is also provided with a receiving unit 18 for receiving fluid jets from the sending member 15 for providing electrical control signals in accordance with the position of an edge of the moving web 13.

A shiftable motor platform 20 is provided with a base plate 21 and a shiftable plate 22. By way of example, and not by way of limitation, the base plate 21 may be secured to a base portion of a web transport machine, and the shiftable plate 22 may be secured to a web alignment roller, not shown, associated with the transport machine. A hydraulically actuated cylinder 24 has one end 26 thereof secured to the shiftable plate 22, and the other end 27 thereof secured to the base plate 21.

As the edge of the moving web 13 shifts laterally relative to the sensing head 12 from a desired position, the corresponding control signal will be applied to a sequencing control panel 30. This action will cause the appropriate relays and solenoid valves to become energized in a predetermined sequence, thereby actuating the hydraulic cylinder 24 in a corresponding direction which, in turn, will shift the edge of the moving web 13 to a predetermined neutral position relative to the sensing head.

The fluid operated sensing head 12 is provided with a mounting stud 31 which has extending therefrom a shaft 32. A U-shaped adjusting bracket 33 is provided for receiving the shaft 32, and the bracket 33 is provided with a mounting shaft 34 and a securing stud 35.

The fluid operated sensing head 12 is electrically connected to the sequencing control panel 30 by means of a three wire conductor 37. Wires 38, 39 and 40, of the conductor 37, are secured to terminals 41, 42 and 43, respectively. A Cyclomonitor 45 is electrically connected to the sequencing control panel 30 by means of conductors 46 and 47 which are secured to terminals 48 and 49 respectively. The Cyclomonitor 45 is provided with a rotating shaft 52. A friction contact wheel 54 is secured to the shaft 52 and rotatable therewith. The friction wheel 54 is coupled with a part moving in synchronism with the movement of the web 13 so that the shaft 52 may rotate a predetermined number of revolutions each time a predetermined length of the web moves past the sensing head. The Cyclomonitor 45 is provided with an electrical contactor which is closed for an interval after the predetermined number of revolutions of the shaft 52 and then opens again until shaft 52 has again rotated through the predetermined number of revolutions. The interval when the footage control switch 205 (FIGURE 5) of monitor 45 is closed in each cycle is sufficiently long even at maximum web speed to enable actuation of the air operated one-shot hydraulic pump 95. In this manner, the sequencing control panel 30 receives an enabling signal from the Cyclomonitor 45 during active intervals which are spaced apart by a time sufficient to allow movement of a predetermined length of the web 13 past the sensing head. By way of example and not by way of limitation, the Cyclomonitor 45 may be adjusted so as to require a 35 foot length of moving web 13 to pass the sensing head during the on or enabling condition, and an additional 35 foot length of the moving web 13 to pass the sensing head during the off condition. That is, the footage control switch 205, FIGURE 5, of the Cyclomonitor 45 will be sequenced between the on condition and off condition for every 35 foot length of the moving web 13 which moves past the sensing head.

In a web transport machine having a relatively constant web transport speed, the Cyclomonitor 45 may be replaced by a conventional cycle timer having a contactor or switching means which is closed during one time interval and is open during a further time interval, so as to provide alternate on and off intervals of fixed time duration during operation of the web transport means.

Connected to the hydraulic cylinder 24 via hydraulic lines 56 and 57 are a pair of solenoid valves 58 and 59 rspectively. Also connected to the hydraulic lines 56 and 57 are a second pair of solenoid valves 62 and 63 respectively. The solenoid valve 63 is connected to line 57 by means of a hydraulic line 65, while the solenoid valve 62 is connected to the line 56 by means of a hydraulic line 66.

The solenoid valve 58 is electrically connected to the sequencing control panel 30 by means of conductors 68 and 69 which are secured to terminals 70 and 71 respectively, while the solenoid valve 59 is electrically connected to the sequencing control panel 30 by means of conductors 73 and 74, which are secured to terminals 75 and 76 respectively. In a similar fashion, solenoid valve 62 is electrically connected to the sequencing control panel 30 by means of conductors 78 and 79, which are secured to terminals 80 and 81 respectively, while the solenoid valve 63 is electrically connected to the sequencing control panel 30 by means of conductors 82 and 83, which are secured to terminals 84 and 85 respectively. The solenoid valves 58 and 59 are electrically connected together in the sequencing control panel for purposes of simultaneous energization thereof, and the solenoid valves 62 and 63 are also electrically connected together in the sequencing control panel for simultaneous energization.

A relief valve 87 has one end thereof connected to a hydraulic return line 88 and another end thereof connected to a check valve 89 and a reservoir 90 through hydraulic lines 91 and 92, respectively. The output of check valve 89 is connected to a hydraulic pump 95 by means of a hydraulic line 96. The output of hydraulic pump 95 is passed through a check valve 98 and therefrom through a hydraulic line 99 to the input of solenoid valves 58 and 63.

The reservoir 90 is provided with a source of high pressure air sufficient to maintain the fluid in the reservoir 90 under pressure in the direction of check valve 89. The high pressure air is applied to hydraulic pump 95 through an air line 102. A solenoid 95a of hydraulic pump 95 is electrically connected to sequencing control panel 30 by means of conductors 104 and 105 which are secured to terminals 106 and 107 respectively. The hydraulic pump 95 is preferably an air operated one-shot hydraulic pump of a type such as an Airmatic one-shot hydraulic pump. However, it will be understood that other types of hydraulic pumping means may be used, such as conventional gear type sump pumps, or hydraulic reservoirs wherein air pressure differentials are maintained.

Shown in FIGURE 2 is a detailed view of the fluid operated sensing head 12 which is constructed in accordance with the principles of the invention. A sending portion or member 110 is provided with a fluid channel 112 which has a threaded portion 113 for receiving a fluid connection. A first lateral port 115 is provided in one side of the sending member 110, while a second lateral port 116 is provided in the other side of the sending member 110. Lateral ports 115 and 116 extend inward and are in communication with the fluid channel 112. A pair of bosses 118 and 119 are arranged over the lateral ports 115 and 116 respectively. A fluid orifice 121 is provided through the boss 118, which orifice is in communication with the lateral port 115. A fluid orifice 122 is provided through the boss 119, which orifice is in communication with the lateral port 116. The lateral ports 115 and 116 are drilled for respective sides of the sending member 110 to the channel 112 to provide means through which the fluid orifices 121 and 122 can communicate with the fluid channel 112. Therefore, after the orifices 121 and 122 and the fluid channel 112 are in fluid communication, the port opening on each side of the sending member 110 is sealed to prevent any fluid leakage therethrough.

The sensing head 12 is also provided with a receiving portion or member 125, which is secured to the sending member 110 by means of screws 127 and 128. The sending member 110 and the receiving member 125 are provided with body portion 130 and 131 respectively. When the sending member 110 is secured to the receiving member 125 by screws 127 and 128, the extended body portions 130 and 131 are abutted as indicated at 133, thereby providing a parallel sided gap 135 between the members 110 and 125.

The receiving member 125 is provided with a rectangular recess 136 for receiving a resilient diaphragm 137. The resilient diaphragm 137 is secured in place in the rectangular recess 136 by means of a diaphragm cover plate 139. A pair of apertures 141 and 142, which are offset one from the other, are provided in the diaphragm cover 139, as shown in FIGURE 3. The receiving member 125 and the diaphragm cover 139 are constructed and arranged in such a manner as to provide alignment between the center portion of the apertures 142 and 141 and the orifices 121 and 122 respectively.

Secured within the receiving member 125 are switch plug assemblies 145 and 146. The switch plug assembly 145 is provided with a switch plug 149 having a head portion 150 and a reduced dimension body portion 151. The reduced body portion 151 has a portion thereof cut away to provide a slot sufficient in width to receive an electrical switch 154. A pin 155 is provided for securing the switch 154 to the switch plug 149. Also secured to the switch plug 149 is a stop block 157 by means of a pin 158. The stop block 157 has one end thereof abutted against a portion of the switch 154 thereby holding the switch 154 in a substantially fixed position in the slot of switch plug 149. In the secured position, the stop block 157 is extended from the switch plug 149 a sufficient amount to engage an actuator lever 160, of the switch 154, when the switch is actuated. The stop block 157 will therefore prevent the switch actuator lever 160 from being overflexed during actuation, which may otherwise cause premature switch failure.

The switch actuator lever 160 is arranged to be substantially in contact with the diaphragm 137 at or near the center of the aperture 141. As a fluid jet is emitted from orifice 122 it is directed toward and impinges upon the diaphragm 137 near the center of aperture 141. This action will cause the diaphragm 137 to be flexed inward thereby actuating the switch 154.

The switch plug assembly 146 is constructed in substantially the same manner as switch plug assembly 145. However, the switch plug assembly 146 is secured in the receiving member 125 in such a manner as to place the switch actuating lever thereof in alignment with the central portion of aperture 142. A fluid jet from orifice 121 is directed toward and impinges upon the diaphragm 137 at the central portion of aperture 142.

Referring to FIGURE 2, a neutral range of edge positions of a moving web is established between the orifices 121 and 122, as indicated at 163. To maintain the edge alignment control system 10 of FIGURE 1, in a neutral condition, the switch 154 is connected as a normally open switch, while the switch or switch plug assembly 146 is connected as a normally closed switch. Therefore, when the edge of the moving web 13 is in the neutral zone 163, the fluid jet from orifice 121 is impinged upon the diaphragm 137 at the central portion of aperture 142 to maintain the switch associated with switch plug assembly 146 in the actuated condition to provide an electrically open circuit. On the other hand, the fluid jet from orifice 122 is diverted from the diaphragm 137 by means of the edge of the moving web 13 passing therebetween. It can be seen therefore that when the edge of the moving web 13 is in the neutral range of edge positions both switches in the receiving member 125 will be in the electrically open circuit condition, providing no error signals to the sequencing control panel 30, of FIGURE 1.

A milled slot or trough 165 is provided in receiving member 125 in communication with a cavity 166, and with a bore 167. A threaded hole 169 is provided between an outer surface 171 of the receiving member 125 and the bore 167. A second milled trough 172 is in communication with a cavity 173 and with the bore 167. The troughs 165 and 172 are provided for carrying the electrical conductors from switches 154 and 154a. The electrical conductors are laid in the troughs 165 and 172 and are fed through the threaded hole 169 via bore 167. A threaded portion 169a is provided for securing conduit means thereto, which, in turn, provides a sealed channel for the electrical conductors 37, 38 and 39 of FIGURE 1, between the fluid operated sensing head 12 and the sequencing control panel 30. The sending member 110 is provided with an arcuate segment 183, and the receiving member 125 is provided with an arcuate segment 184 to eliminate sharp edges or corners from the sensing head 12 which might otherwise damage the moving web.

A cover 175 and a gasket or gasket compound 174 are provided to seal the electrical conductor and the switch plug assemblies 145 and 146 in the receiving member 125. For a better understanding of the preferred embodiment of the present invention FIGURE 4 shows a section through the receiving member 125 as indicated at IV—IV. To present the switch plug assemblies 145 and 146 from rotating or otherwise becoming misaligned in their cavities, their head portions 150 and 150a are provided with flat sides 177 and 178, and 179 and 180 respectively. The flat sides 178 and 179 are substantially abutted, while the flat sides 177 and 180 are in close relation to adjacent wall portions in the receiving member 125, as shown in FIGURE 4.

Shown in FIGURE 5 is a sequencing control circuit which is used in the operation of the sequencing control panel 30 and is designated generally with reference numeral 30a. The sequencing control circuit 30a is operated by 24 volts A.C. which is obtained from a secondary winding 185 of a step-down transformer 186. The step-down transformer 186 has a primary winding 187 connected to 115 volt A.C. source. The secondary winding 185 is connected between a pair of power lines 189 and 190 which provide electrical power to the sequencing control circuit 30a.

A control relay energizing coil 191 has one lead thereof connected directly to the power line 189 and the other lead thereof connected to the power line 190 through the normally open switch 154 which is located in the sensing head 12. The control relay energizing coil 191 has associated therewith a plurality of contactors 193, 194 and 195 which are normally open and a contactor 196 which is normally closed.

The solenoid valves 58 and 59 each have one lead thereof connected together and connected directly to the power line 189, and each has the other lead thereof connected together and to the power line 190 through contactor 193. A red indicating lamp 195 has one lead thereof connected directly to the power line 189 and the other lead thereof connected to the power line 190 through contactor 194. A green indicating lamp 197 has one lead thereof connected directly to the power line 189 and the other lead thereof connected to the power line 190 through the contactor 196. Connected to the power line 190 through contactor 195 is one lead of a control relay energizing coil 199. The other lead of the control relay energizing coil 199 is connected to a self-actuated contactor 201 and to a circuit point 202. The terminal point 202 is connected to the power line 189 through a contactor 205 which is operated by the Cyclomonitor 45.

A control relay energizing coil 207 has one lead thereof connected directly to the power line 189 and the other lead thereof connected to the power line 190 through normally closed switch 154a which is located in the sensing head 12. The control relay energizing coil 207 has associated therewith a plurality of contactors 208, 209 and 210 which are normally open and a contactor 211 which is normally closed. The switch 154a is shown in the closed condition and the contactors 208-211 are shown in their energized condition as indicated by the solid line, which condition indicates the web 13 has moved in a direction to obstruct the fluid jet from orifice 121. When the web 13 is in the neutral zone 163 of the sensing head 12, the switch 154a and contactors 208-211 are in the deenergized position indicated by their dotted line.

The solenoid valves 62 and 63 each have one lead thereof connected together and connected directly to the power line 189, and each have the other lead thereof connected together and to the power line 190 through contactor 209. The green indicating lamp 197 is also connected to power line 190 through contactor 208, while the red indicating lamp 195 is also connected to the power line 190 through contactor 211. The control relay energizing coil 199 is also connected to power line 190 through the contactor 210.

Connected to the power line 190 is one lead of a control relay energizing coil 215 which has the other lead therefrom connected to a terminal point 216 and to a felt actuated contactor 217. The circuit point 216 is connected to the terminal point 202 through a contactor 201 when the relay energizing coil 199 is energized. The hydraulic pump 95a has the electrical leads therefrom connected between the power line 190 and the circuit point 216.

In operation, the fluid operated sensing head 12 is placed in position to receive a portion of the moving web 13 which will move between the sending member 110 and the receiving member 125. Fluid from line 16, which is preferably connected to the city water supply, is applied to the sensing head 12 through the fluid channel 112. By means of orifices 121 and 122, the fluid is then emitted from the sensing head 12 in the form of a pair of fluid jets. The fluid jet from orifice 121 is directed toward the diaphragm 137 and impinges thereupon at the central area of aperture 142. Also, when the moving web 13 is displaced from the neutral zone 163 of the sensing head 12, the fluid jet from orifice 122 is directed toward the diaphragm 137 and impinges thereupon at the central area of aperture 141. The fluid jets impinging upon the diaphragm 137 will impart sufficient axial movement to the diaphragm 137 at regions 137a and 137b thereof, FIGURE 4, to actuate the switches 154 and 154a.

When the edge of the moving web 13 is in the neutral zone 163, the fluid jet from orifice 121 will impart actuating pressure to the switch 154a, which is otherwise normally closed, thereby rendering the switch 154a in an electrically open condition. However, the fluid jet from orifice 122 is blocked by the presence of the web 13 and the normally open switch 154 is not actuated. Thus when the edge of the moving web 13 is positioned in the zone 163, the switches 154 and 154a are both electrically open and no error signal is supplied to the sequencing control panel 30.

Referring now to FIGURES 1 and 5, when the edge of the moving web 13 moves out of the neutral zone in a direction to leave both fluid jets from the sensing head 12 unobstructed the fluid jet from orifice 122 will impinge upon the diaphragm 137. This action will close switch 154 to energize the relay coil 191 which, in turn, will actuate the contactors 193, 194, 195 and 196. Power will then be applied to the solenoid valves 58 and 59 through the contactor 193, while at the same instant power will be removed from the green indicating lamp 197 by the opening of contactor 196. The red indicating lamp 195 is maintained energized by the normally closed contactor 211 to indicate the web 13 is out of the neutral zone 163 in a direction to leave both fluid jets unobstructed. Also when the relay coil 191 is energized, power is applied to one side of a relay coil 199 through the contactor 195. The other side of relay coil 199 is connected to circuit point 202 which, in turn, is connected to power line 189 when cycling switch 205 is closed. Should the switch 205 be in the closed position when relay coil 191 is energized, the relay coil 199 will also be energized, thereby actuating the contactor 201. The contactor 201 will apply power to the solenoid 95a of hydraulic pump 95 and the relay holding coil 215 which, in turn, will actuate the contactor 217, thereby holding the solenoid 95a energized for as long as the cycling switch 205 is closed. When the solenoid 95a is energized, air under pressure from line 102 is applied to the one-shot hydraulic pump 95 to cause movement of a piston, which is in the pump 95, in a direction to produce hydraulic fluid flow through the check valve 98 into the line 99. When solenoid 95a is deenergized, the piston in pump 95 will return to its original position and a new supply of hydraulic fluid from reservoir 90 will enter the pump 95.

As mentioned hereinabove, when the solenoid valves 58 and 59 are energized and the hydraulic pump 95 is energized, hydraulic fluid from line 56 is applied to a chamber in the cylinder 24 and a corresponding quantity of fluid from another chamber in cylinder 24 will enter line 57. The chambers in cylinder 24 are separated by a movable piston. Thus the hydraulic cylinder 24 is actuated to shift the shiftable motor platform 20 and move a suitable web alignment roller stand (not shown) in the direction necessary to place the edge of the moving web 13 within the neutral zone 163, of FIGURE 2, thereby again interrupting the fluid jet stream from orifice 122 to deactuate switch 154.

If the edge of the moving web 13 moves inward toward the sensing head 12 a sufficient amount to obstruct the fluid jet stream from orifice 121, the electrically open switch 154a will thereby be actuated to energize the relay coil 207 which, in turn, will actuate the contactors 208, 209, 210 and 211 as indicated by their solid line. Power is then applied to solenoid valves 62 and 63 through contactor 209 and power is removed from the red indicating lamp 195 by the opening of contactor 211. The green indicating lamp 197 is maintained energized through contactors 196 and 208 thereby indicating the misalignment of the edge of the moving web 13 in a direction to obstruct the fluid jets from orifices 121 and 122. Should the cycle switch 205 be closed when the relay coil 207 is energized the power will be applied to the relay coil 199 through contactor 210. This action will energize the relay coil 215 and apply operating power to the hydraulic solenoid 95a and hydraulic pump 95 as described hereinabove.

The hydraulic fluid from pump 95 is applied to the energized solenoid valve 63 and therefrom through hydraulic line 57 to the cylinder 24. A quantity of hydraulic fluid from line 57 is applied to a chamber in the cylinder 24 and a corresponding quantity of fluid from another chamber in cylinder 24 will enter the line 56. The fluid in line 56 will pass through the energized solenoid valve 62 and relief valve 87 and enter the reservoir 90. This action will actuate the hydraulic cylinder 24 which, in turn, will shift the shiftable motor platform 20 in the desired direction to move a suitable web alignment roll stand, not shown, in a direction to tend to move the edge of the web 13 away from the sensing head 12 thereby allowing the fluid jet from orifice 121 to once again impart actuating force on the switch 154a.

It should be noted that when either sensing switch 154 or 154a is electrically closed, the fluid from hydraulic pump 95 passes through hydraulic line 99 in the same direction toward the solenoid valves 58 and 63. However, in one instance, when sensing switch 154 is actuated, the solenoid valves 58 and 59 are energized, while the solenoid valves 62 and 63 are deenergized. This action will cause hydraulic fluid to flow from the pump 95 to the cylinder 24 via hydraulic line 99, solenoid valve 58 and hydraulic line 56, while hydraulic fluid from the cylinder 24 flows to the pump 95 via hydraulic line 57, solenoid valve 59, and hydraulic lines 88 and 91. However, when the sensing switch 154a is deactuated, hydraulic fluid from pump 95 will flow to the cylinder 24 via hydraulic line 99, solenoid valve 63, hydraulic line 65 and hydraulic line 57, while the hydraulic fluid from cylinder 24 flows to the pump 95 via hydraulic line 56, hydraulic line 66, solenoid valve 62, hydraulic line 88, line 91 and line 96.

It can be seen therefore that the hydraulic pump 95 is always operated in the same direction and by merely changing the path of hydraulic fluid to and from the hydraulic cylinder 24 by means of sequencing various solenoid valves in the hydraulic lines, the direction of movement of shiftable motor platform 20 can be changed.

The web 13 may comprise a paper forming wire which travels in a loop past the sensing head 12. A slurry of paper compound is applied to the forward or active run of the forming wire, and during the return run of the wire loop the edge of the wire is sensed by the sensing head 12. In this instance, the shiftable motor platform 20 is connected to the ends of a pair of rollers which have the forming wire loop wrapped thereabout so that the entire active surface as well as the inactive surface of the forming wire can be shifted to maintain the slurry in proper position. It may be noted that in some instances it may be desirable to change the sense of movement of the hydraulic cylinder 24 to compensate for differences in the sense in lateral movement between the edge of the active surface which carries the slurry and the edge of the inactive surface which is sensed.

The foregoing description of this invention concerns only the preferred embodiment thereof, and changes and modifications may be made therein by those skilled in the art without departing from the spirit and scope of the novel concepts of this invention.

I claim as my invention:

1. In an edge alignment control system including:

motor means having a hydraulic actuating cylinder for controlling the position of an edge of a paper forming wire extending in a loop including an active run and a return run;

sequential control means for receiving electrical signals indicative of position of the edge of said paper forming wire, said sequential control means being connected to said hydraulic actuating cylinder for control thereof in response to said electrical signals;

wherein the improvement comprises:

a sensing head having a sending member and a receiving member disposed in operative association with the return run of said forming wire, means connected with said sending member for supplying water under pressure thereto for discharge from the sending member as water jets directed toward said receiving member for detecting errors in the position of said forming wire in respective opposite directions from a correct range of positions of said forming wire and for producing electrical error signals in response to such errors, said error signals being delivered to said sequential control means, said receiving member including at least two apertures in alignment with respective ones of said water jets from said sending member;

a resilient member overlying each of said apertures; and a switch assembly mounted adjacent the surface of each of said resilient members opposite said water jets each of said switch assemblies including a switch having an actuator which is depressed by said resilient member in response to the respective water jet, and means for limiting the travel distance of said actuator.

2. An edge alignment control system according to claim 1 wherein said sending member has an apertured boss formed thereon to generate each water jet.

References Cited

UNITED STATES PATENTS

| | | | | |
|---|---|---|---|---|
| 535,669 | 3/1895 | Burt | | 239—446 |
| 1,652,599 | 12/1927 | Ayers | | 239—550 X |
| 2,726,735 | 12/1955 | Rohrberg | | 55—40 |
| 2,860,840 | 11/1958 | Jacobsen et al. | | 242—57 |
| 2,884,495 | 4/1959 | Frankel | | 200—61.13 |
| 2,992,781 | 7/1961 | Howard | | 239—550 X |
| 3,039,483 | 6/1962 | Deering | | 137—83 |
| 3,056,003 | 9/1963 | Rabinow | | 200—81.9 |

EDGAR W. GEOGHEGAN, *Primary Examiner.*

MARTIN P. SCHWADRON, *Examiner.*

G. N. BAUM, *Assistant Examiner.*